(12) United States Patent
Byun

(10) Patent No.: US 11,169,721 B2
(45) Date of Patent: Nov. 9, 2021

(54) MEMORY SYSTEM FOR FLEXIBLE MAP BLOCK MANAGEMENT AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 139 days.

(21) Appl. No.: 16/556,400

(22) Filed: Aug. 30, 2019

(65) Prior Publication Data

US 2020/0183599 A1 Jun. 11, 2020

(30) Foreign Application Priority Data

Dec. 6, 2018 (KR) .................. 10-2018-0155911

(51) Int. Cl.
*G06F 3/06* (2006.01)
(52) U.S. Cl.
CPC .......... *G06F 3/0631* (2013.01); *G06F 3/0604* (2013.01); *G06F 3/0653* (2013.01); *G06F 3/0673* (2013.01)
(58) Field of Classification Search
CPC .... G06F 3/0631; G06F 3/0673; G06F 3/0653; G06F 3/0604; G06F 3/0652; G06F 3/0679; G06F 3/061; G06F 12/0246; G06F 2212/7201
See application file for complete search history.

(56) References Cited

U.S. PATENT DOCUMENTS

| | | | | |
|---|---|---|---|---|
| 2008/0005530 A1* | 1/2008 | Nakano | ............... | G06F 12/0246 711/207 |
| 2011/0161560 A1* | 6/2011 | Hutchison | ........... | G06F 12/0246 711/103 |
| 2011/0271043 A1* | 11/2011 | Segal | .................. | G06F 12/0246 711/103 |
| 2012/0254574 A1* | 10/2012 | Sinclair | ............... | G11C 11/5628 711/165 |
| 2020/0042455 A1* | 2/2020 | Cho | .................... | G06F 12/0246 |

FOREIGN PATENT DOCUMENTS

| | | |
|---|---|---|
| KR | 10-2016-0113483 | 9/2016 |
| KR | 10-2017-0035155 | 3/2017 |

\* cited by examiner

*Primary Examiner* — Larry T Mackall
(74) *Attorney, Agent, or Firm* — IP & T Group LLP

(57) ABSTRACT

A memory system may include a memory device including a plurality of memory blocks; and a controller suitable for controlling the memory device. The controller may include a monitor suitable for monitoring valid data ratios of a first area and a second area and a processor suitable for comparing a first valid data ratio of the first area to a first threshold value, comparing a second valid data ratio of the second area to a second threshold value, and reallocating a target reserved memory block, which is allocated to the second area, to the first area according to the two comparison results.

22 Claims, 15 Drawing Sheets

MEMORY SYSTEM FOR FLEXIBLE MAP BLOCK MANAGEMENT AND OPERATING METHOD THEREOF

CROSS-REFERENCE TO RELATED APPLICATION

This application claims priority under 35 U.S.C. § 119 to Korean Patent Application No. 10-2018-0155911 filed on Dec. 6, 2018, which is incorporated herein by reference in its entirety.

BACKGROUND

1. Field

Exemplary embodiments relate to a memory system and an operating method thereof and, more particularly, to a memory system and an operating method thereof capable of improving an efficiency of a data processing.

2. Discussion of the Related Art

The computer environment paradigm has become ubiquitous, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems are generally expected to provide excellent stability, durability, high information access speed, and low power consumption, since they have no moving parts compared to a hard disk device. Examples of memory systems having such advantages include universal serial bus (USB) memory devices, memory cards having various interfaces, and solid state drives (SSDs).

SUMMARY

Various embodiments are directed to a memory system capable of processing data efficiently.

In accordance with an embodiment of the present invention, a memory system includes: a memory device including a plurality of memory blocks; and a controller suitable for controlling the memory device, wherein the controller comprises: a monitor suitable for monitoring valid data ratios of a first area and a second area; and a processor suitable for comparing a first valid data ratio of the first area to a first threshold value, comparing a second valid data ratio of the second area to a second threshold value, and reallocating a target reserved memory block, which is allocated to the second area, to the first area according to the two comparison results.

In accordance with an embodiment of the present invention, an operating method for a memory system which includes a memory device and a controller, the operating method includes: monitoring valid data ratios of a first area and a second area within the memory device; comparing a first valid data ratio of the first area to a first threshold value; comparing a second valid data ratio of the second area to a second threshold value when the first valid data ratio is greater than or equal to the first threshold value; and reallocating a target reserved memory block, which is allocated to the second area, to the first area, when the second valid data ratio is less than the second threshold value.

In accordance with an embodiment of the present invention, a memory system includes: a memory device including a map area, which includes map blocks and at least one reserved block, and a user area, which includes user memory blocks and reserved memory blocks; and a controller suitable for: determining a first ratio for valid pages of the map blocks and a second ratio for valid pages of the user memory blocks; and allocating at least one reserved memory block among the reserved memory blocks to the map area, based on the first and second ratios, wherein the controller allocates the at least one reserved memory block to the map area, when the first ratio exceeds a first threshold value and the second ratio is less than a second threshold value.

DETAILED DESCRIPTION

Figure 1:
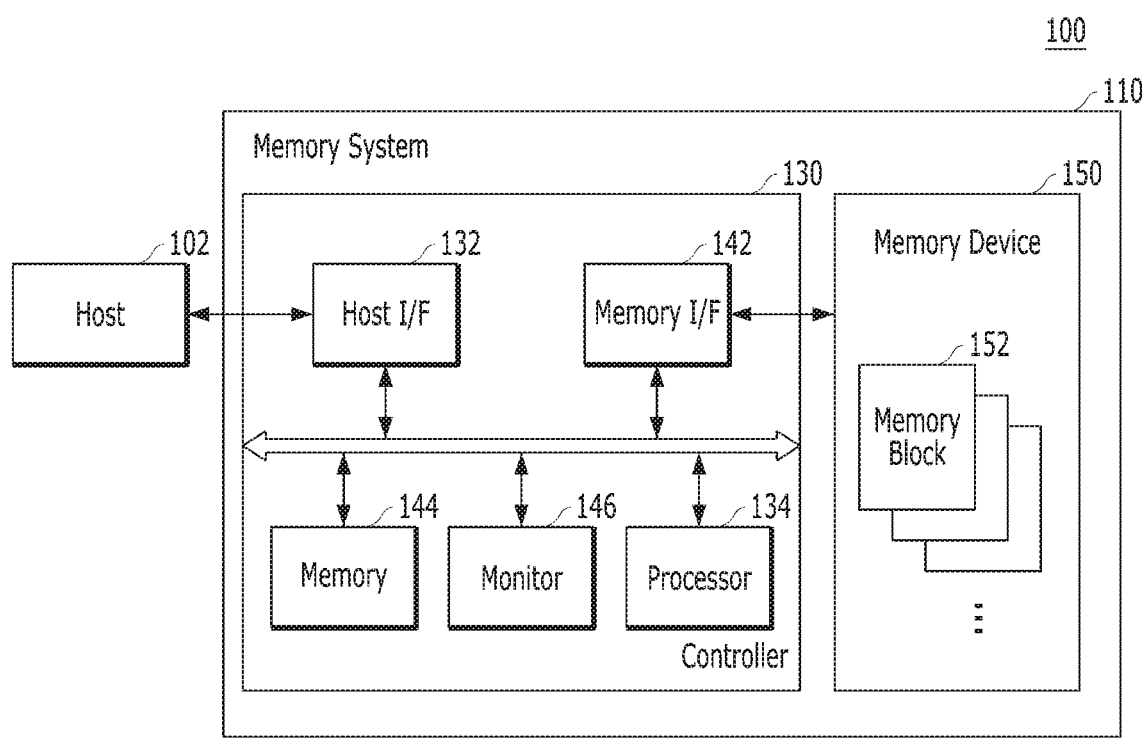
FIG. 1 is a block diagram illustrating a data processing system including a memory system in accordance with an embodiment of the present disclosure.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is noted that reference to "an embodiment" does not necessarily mean only one embodiment, and different references to "an embodiment" are not necessarily to the same embodiment(s).

It will be understood that, although the terms "first" and/or "second" may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that describe the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof.

The above-described exemplary embodiments are merely for the purpose of understanding the technical spirit of the present disclosure and the scope of the present disclosure should not be limited to the above-described exemplary embodiments. It will be obvious to those skilled in the art to which the present disclosure pertains that other modifications based on the technical spirit of the present disclosure may be made in addition to the above-described exemplary embodiments.

Unless otherwise defined, all terms including technical and scientific terms used herein have the same meaning as commonly understood by one of ordinary skill in the art to which the present disclosure belongs. Unless otherwise defined in the present disclosure, the terms should not be construed as being ideal or excessively formal.

Hereinafter, the various embodiments of the present invention will be described in detail with reference to the attached drawings.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may include any of a variety of portable electronic devices such as a mobile phone, a MP3 player and a laptop computer, or any of a variety of non-portable electronic devices such as a desktop computer, a game machine, a television (TV) and a projector.

The host 102 may include at least one operating system (OS) or a plurality of operating systems. The host 102 may execute an OS to perform an operation corresponding to a user's request on the memory system 110. Here, the host 102 may provide a plurality of commands corresponding to a user's request to the memory system 110. Thus, the memory system 110 may perform certain operations corresponding to the plurality of commands that is, corresponding to the user's request. The OS may manage and control overall functions and operations of the host 102. The OS may support an operation between the host 102 and a user using the data processing system 100 or the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of the memory system 110 include a solid state drive (SSD), a multi-media card (MMC) and an embedded MMC (eMMC).

The memory system 110 may include various types of storage devices. Non-limiting examples of such storage devices include volatile memory devices such as a dynamic random access memory (DRAM) and a static RAM (SRAM), and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), and a flash memory.

The memory system 110 may include a memory device 150 and a controller 130.

The controller 130 and the memory device 150 may be integrated into a single semiconductor device, which may be included in any of the various types of memory systems as described above. For example, the controller 130 and the memory device 150 may be integrated as a single semiconductor device to constitute a solid state drive (SSD), a personal computer memory card international association (PCMCIA) card, a secure digital (SD) card (e.g., a mini-SD, a micro-SD and a SDHC), and an UFS device. The memory system 110 may be configured as a part of a computer, a smart phone, a portable game player, or one of various components configuring a computing system.

The memory device 150 may maintain stored data even though power is not supplied. In particular, the memory device 150 stores data provided from the host 102, through a write operation, and provides stored data to the host 102, through a read operation. The memory device 150 includes a plurality of memory blocks. Each of the memory blocks includes a plurality of pages. Each of the pages includes a plurality of memory cells to which a plurality of word lines (WL) are coupled. In an embodiment, the memory device 150 may include a plurality of memory dies (not shown), and each memory die may include a plurality of planes (not shown). Each plane may include a plurality of memory blocks, each of which may include a plurality of pages, each of which may include a plurality of memory cells coupled to a word line. In an embodiment, the memory device 150 may be a flash memory having a 3-dimensional (3D) stack structure.

Figure 2:
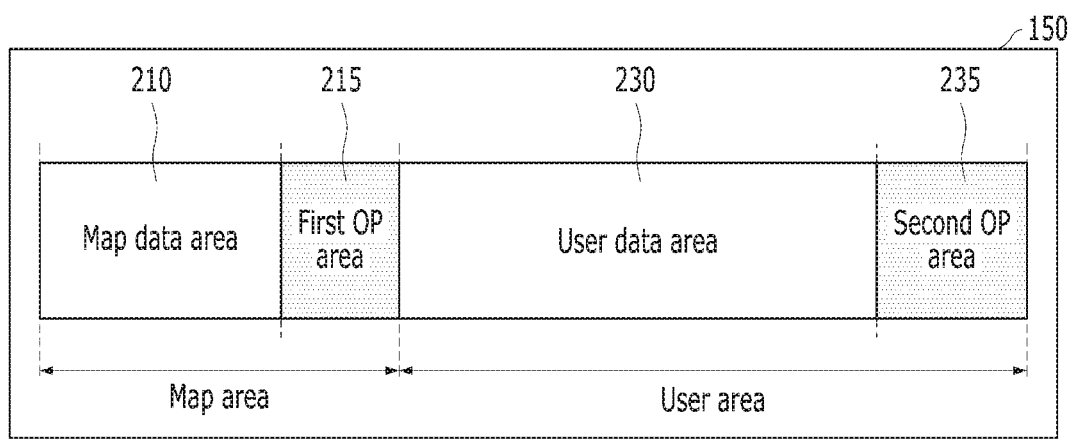
FIG. 2 is a diagram illustrating a map area and a user area included in a memory device in accordance with an embodiment of the present disclosure.

Referring to FIG. 2, the memory device 150 may include a map area and a user area. Each of the map area and the user area may include a data area and an over-provisioning (OP) area. Specifically, the map area may include a map data area 210 and a first OP area 215. The map data area 210 may include a plurality of map memory blocks in which map data corresponding to user data are stored. The map data may include logical address information corresponding to the user data and information on physical addresses where the user data are actually stored. The user area may include a user data area 230 and a second OP area 235. The user data area 230 may include a plurality of user memory blocks having user data stored therein.

The first OP area 215 and the second OP area 235 may be required to maintain the operation performance of the memory device 150.

In particular, the controller 130 may allocate a plurality of reserved memory blocks to the first and second OP areas 215 and 235. The controller 130 may efficiently perform functions required for driving the memory device 150 by using the plurality of reserved memory blocks. The functions may include wear leveling, garbage collection, bad block management and the like. Therefore, the OP areas 215 and 235 need to be efficiently used, in order to maintain the performance of the memory device 150 and to extend the lifetime of the memory device 150.

Detailed descriptions for the structure of the memory device 150 and the 3D stack structure of the memory device 150 will be made later with reference to FIGS. 3 to 5.

Referring back to FIG. 1, the controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program, and erase operations of the memory device 150.

The controller 130 includes a host interface (I/F) 132, a processor 134, a memory interface (I/F) 142, a memory 144 and a monitor 146.

The host interface 132 may process a command and data of the host 102, and may be configured to communicate with the host 102 through at least one among various interface protocols such as universal serial bus (USB), serial advanced technology attachment (SATA), small computer system interface (SCSI) and enhanced small disk interface (ESDI). The host interface 132 may be driven through a firmware referred to as a host interface layer (HIL) being a region which exchanges data with the host 102.

The memory interface 142 serves as a memory/storage interface which performs interfacing between the controller 130 and the memory device 150, to allow the controller 130 to control the memory device 150 in response to a request from the host 102.

The memory 144 as the working memory of the memory system 110 and the controller 130 stores data for driving of the memory system 110 and the controller 130.

The memory 144 may be realized by a volatile memory. For example, the memory 136 may be realized by a static random access memory (SRAM) or a dynamic random access memory (DRAM). Furthermore, the memory 144 may exist inside the controller 130. Alternatively, the memory 144 may exist outside the controller 130, and may be realized as an external volatile memory to and from which data are inputted to and outputted from the controller 130 through a memory interface.

The memory 144 may store data required to perform data write and read operations between the host 102 and the memory device 150 and other data required for the controller 130 and the memory device 150 to perform these operations. The memory 144 may include a program memory, a data memory, a write buffer/cache, a read buffer/cache, a data buffer/cache and a map buffer/cache for storing the data.

The processor 134 may control overall operations of the memory system 110 and program or read operation of memory device 150 in response to a write request or a read request of host 102. In order to control overall operations of the memory system 110, the processor 134 may use firmware to control the overall operations of the memory system 110. The firmware may be referred to as flash translation layer (FTL). The processor 134 may be implemented with a microprocessor or a central processing unit (CPU).

The controller 130 may perform an operation requested by the host 102 in the memory device 150 through the processor 134. Also, the controller 130 may perform a background operation on the memory device 150 through the processor 134. The background operation on the memory device 150 may include a garbage collection (GC) operation, a wear-leveling (WL) operation, a map flush operation, or a bad block management operation. A garbage collection operation will be described in detail with reference to FIGS. 6A and 6B.

The processor 134 may manage the OP areas 215 and 235 in the map area and the user area of the memory device 150, respectively. For example, the processor 134 may allocate reserved memory blocks to the first and second OP areas 215 and 235, respectively. The processor 134 may reallocate the reserved memory blocks based on the respective valid page ratios of the map area and the user area. For example, the processor 134 may reallocate the reserved memory blocks in the user area to the map area, based on the valid page ratios.

The processor 134 may store an OP table in the memory 144. The OP table may indicate the positions where the reserved memory blocks are allocated. When the reserved memory blocks are reallocated, the processor 134 may update the OP table stored in the memory 144. A specific operation of the processor 134 within the controller 130 will be described with reference to FIGS. 7A to 9.

The monitor 146 may monitor the valid page ratio of the map area or the user area. The valid page ratio may indicate the size of valid pages with respect to the entire size of each area. Therefore, when the size of the valid pages decreases or the size of the entire space increases, the valid page ratio may decrease.

While not shown in a drawing, the controller 130 may further include an error correction code (ECC) unit and a power management unit (PMU).

The ECC unit may correct an error bit of data processed in the memory device 150, and may include an ECC encoder and an ECC decoder.

The ECC encoder may perform error-correction encoding on data to be programmed in the memory device 150 and generate data added with parity bits. The data added with parity bits may be stored in the memory device 150. The ECC decoder detects and corrects an error included in data read from the memory device 150, when reading the data stored in the memory device 150.

The ECC unit may perform error correction by using an LDPC (low density parity check) code, a BCH (Bose, Chaudhuri, Hocquenghem) code, a turbo code, a Reed-Solomon code, a convolution code, an RSC (recursive systematic code), TCM (trellis-coded modulation) or BCM (Block coded modulation). However, it is to be noted that the disclosure is not limited thereto. The ECC unit may include all circuits, modules, systems or devices for error correction.

The PMU may provide and manage power of the memory system 110. That is, the PMU may provide and manage power of the components included in the controller 130 and the memory device 150.

Hereinbelow, a memory device in the memory system in accordance with the embodiment of the disclosure will be described in detail with reference to FIGS. 3 to 5.

Figure 3:
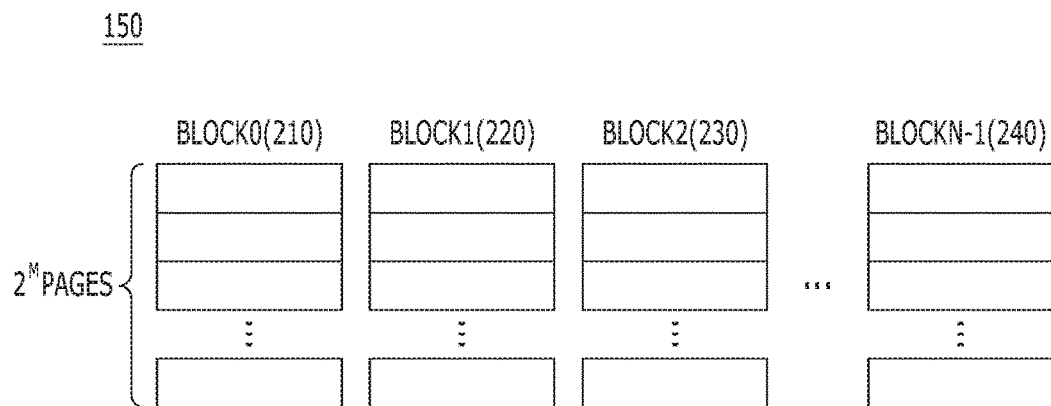
FIG. 3 is a diagram illustrating a memory cell array of a memory block in the memory device shown in FIG. 1.

FIG. 3 is a schematic diagram illustrating the memory device 150. FIG. 4 is a diagram illustrating a memory cell array of a memory block 330 in the memory device 150. FIG. 5 is a diagram illustrating an exemplary three-dimensional (3D) structure of the memory device 150.

Referring to FIG. 3, the memory device 150 may include a plurality of memory blocks BLOCK0 to BLOCKN−1, where N is an integer greater than 1. Each of the blocks BLOCK0 to BLOCKN−1 may include a plurality of pages, for example, $2^M$ or M pages, the number of which may vary according to circuit design, M being an integer greater than 1. Each of the pages may include a plurality of memory cells that are coupled to a plurality of word lines WL.

Memory cells in the respective memory blocks BLOCK0 to BLOCKN−1 may be one or more of a single level cell (SLC) storing 1-bit data or a multi-level cell (MLC) storing 2-bit data. Hence, the memory device 150 may include memory blocks including SLC (i.e., SLC memory blocks) or memory blocks including MLC (i.e., MLC memory blocks), depending on the number of bits which can be expressed or stored in each of the memory cells in the memory blocks. The SLC memory blocks may include a plurality of pages which are embodied by memory cells, each storing one-bit data. The SLC memory blocks may generally have higher data computing performance and higher durability than the MLC memory blocks. The MLC memory blocks may include a plurality of pages which are embodied by memory cells each storing multi-bit data (for example, 2 or more bits). The MLC memory blocks may generally have larger data storage space, that is, higher integration density, than the SLC memory blocks. In another embodiment, the memory device 150 may include a plurality of triple level cell (TLC) memory blocks. The TLC memory blocks may include a plurality of pages which are embodied by memory cells each capable of storing 3-bit data. In yet another embodiment, the memory device 150 may include a plurality of quadruple level cell (QLC) memory blocks. The QLC memory blocks may include a plurality of pages which are embodied by memory cells each capable of storing 4-bit data.

Instead of a nonvolatile memory, the memory device 150 may be implemented by any one of a phase change random access memory (PCRAM), a resistive random access memory (RRAM or ReRAM), a ferroelectrics random access memory (FRAM), and a spin transfer torque magnetic random access memory (STT-RAM or S MRAM).

The memory blocks 210, 220, 230, 240 may store the data transferred from the host 102 through a program operation, and may transfer data stored therein to the host 102 through a read operation.

Figure 4:
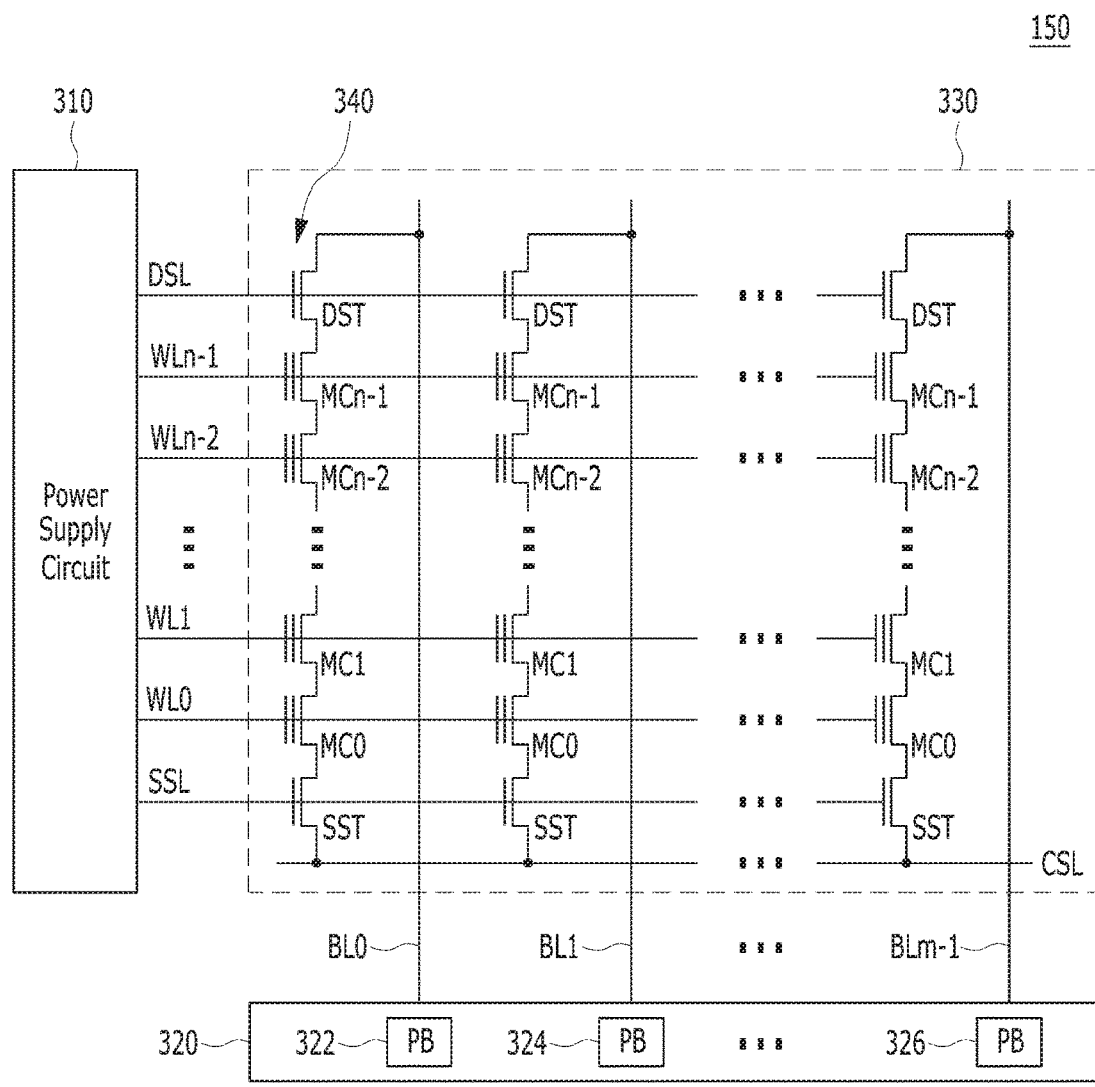
FIG. 4 is a diagram illustrating a memory device of a memory system in accordance with an embodiment of the present invention.
Figure 5:
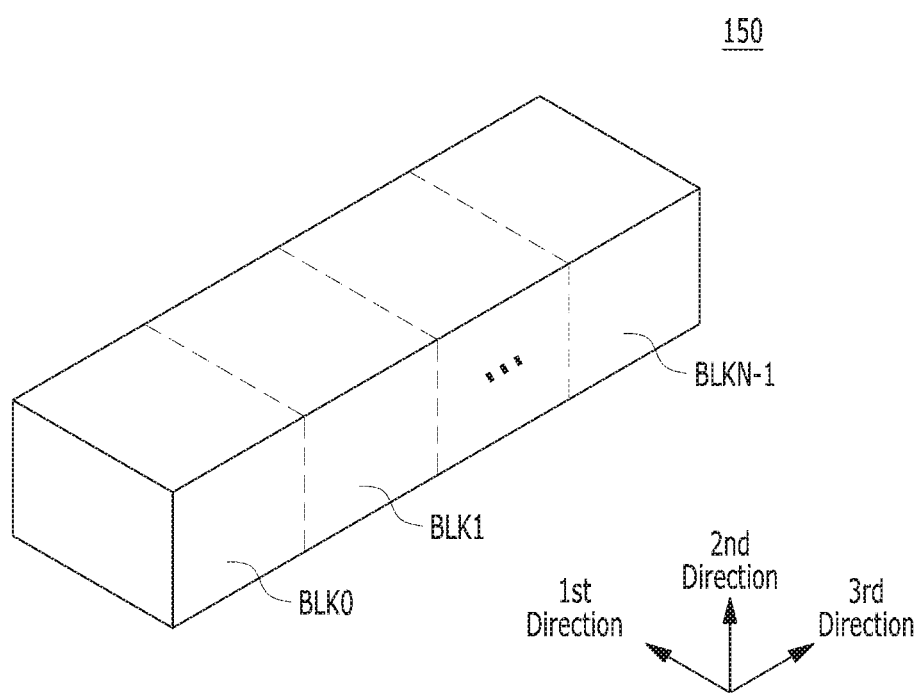
FIG. 5 is a diagram illustrating a memory system in accordance with an embodiment of the present invention.

Referring to FIG. 4, the memory device 150 may include a plurality of memory blocks. Each memory block 330 may include a plurality of cell strings 340 which are realized as a memory cell array and are coupled to bit lines BL0 to BLm−1, respectively. The cell string 340 of each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1.

While FIG. 4 shows, as an example, each memory block 330 which is configured by NAND flash memory cells, it is noted that each of the plurality of memory blocks in the memory device 150 is not limited to a NAND flash memory and may be realized by a NOR flash memory, a hybrid flash memory in which at least two types of memory cells are combined or a one-NAND flash memory in which a controller is built in a memory chip.

A power supply circuit 310 of the memory device 150 may provide word line voltages (for example, a program voltage, a read voltage and a pass voltage) to be supplied to respective word lines depending on an operation mode and a voltage to be supplied to a bulk (for example, a well region) where memory cells are formed. The voltage generating operation of the power supply circuit 310 may be performed under the control of a control circuit (not shown). The power supply circuit 310 may generate a plurality of variable read voltages to generate a plurality of read data, select one among the memory blocks (or sectors) of a memory cell array in response to the control of the control circuit, select one among the word lines of the selected memory block, and provide word line voltages to the selected word line and unselected word lines.

The memory device 150 may include a read/write circuit 320 which is controlled by the control circuit. During a verification/normal read operation, the read/write circuit 320 may operate as a sense amplifier for reading (sensing and amplifying) data from the memory cell array. During a program operation, the read/write circuit 320 may operate as a write driver for supplying a voltage or a current to bit lines according to data to be stored in the memory cell array. During a program operation, the read/write circuit 320 may receive data to be stored into the memory cell array from a buffer (not illustrated), and drive bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

The memory device 150 may be realized as a two-dimensional or three-dimensional memory device. In particular, as shown in FIG. 5, the memory device 150 may be realized as a nonvolatile memory device with a three-dimensional stack structure. In the case where the memory device 150 is realized as a three-dimensional structure, the memory device 150 may include a plurality of memory blocks BLK0 to BLKN−1. FIG. 5 is a diagram illustrating the memory blocks of the memory device 150 illustrated in FIG. 1, and each of the memory blocks may be realized as a three-dimensional structure (or a vertical structure). For example, the respective memory blocks may be realized as a three-dimensional structure by including a structure which extends in first to third directions, for example, an x-axis direction, a y-axis direction and a z-axis direction.

Each memory block 330 in the memory device 150 may include a plurality of NAND strings NS which extend in the second direction. The plurality of NAND strings NS may be provided in the first direction and the third direction. Herein, each of the NAND strings NS may be coupled to a bit line BL, at least one string select line SSL, at least one ground select line GSL, a plurality of word lines WL, at least one dummy word line DWL, and a common source line CSL, and each of the NAND strings NS may include a plurality of transistor structures TS.

Namely, among the plurality of memory blocks of the memory device 150, each memory block 330 may be coupled to a plurality of bit lines BL, a plurality of string select lines SSL, a plurality of ground select lines GSL, a plurality of word lines WL, a plurality of dummy word lines DWL and a plurality of common source lines CSL, and accordingly, may include a plurality of NAND strings NS. Also, in each memory block 330, a plurality of NAND strings NS may be coupled to one bit line BL, and thereby, a plurality of transistors may be realized in one NAND string NS. The string select transistor SST of each NAND string NS may be coupled with a corresponding bit line BL, and the ground select transistor GST of each NAND string NS may be coupled with the common source line CSL. Memory cells MC may be provided between the string select transistor SST and the ground select transistor GST of each NAND string NS. Namely, in each memory block 330 of the plurality of memory blocks of the memory device 150, a plurality of memory cells may be realized.

Figure 6A:
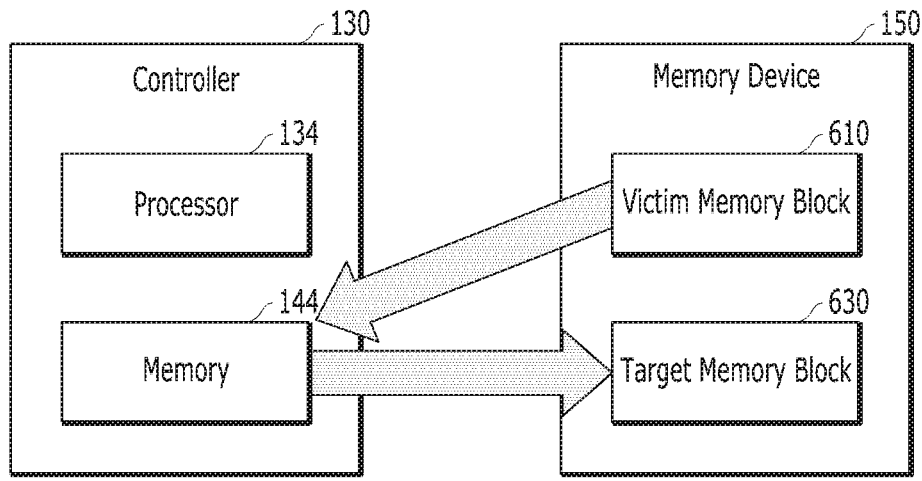
FIGS. 6A and 6B are flowcharts illustrating an operation process of a memory system in accordance with an embodiment of the present disclosure.
Figure 6B:
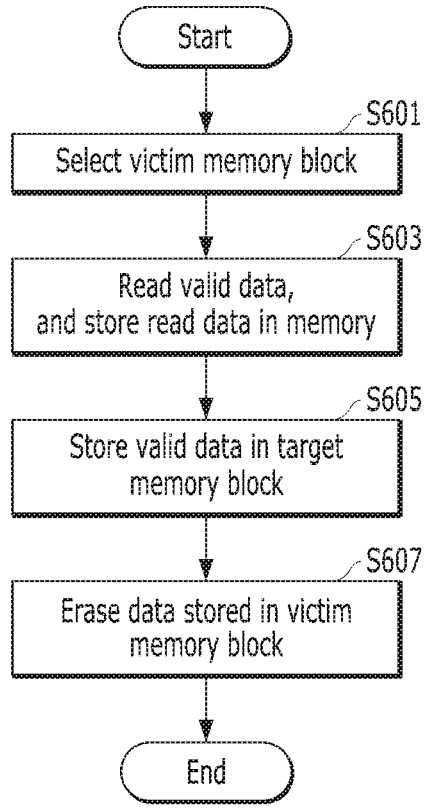

FIGS. 6A and 6B illustrate an operation of the memory system 110 in accordance with an embodiment. By way of example, FIGS. 6A and 6B show the garbage collection operation as the background operation that the controller 130 performs on the memory device 150. Although the following descriptions will be focused on the garbage collection operation, this is only an example, and the present embodiment is not limited thereto.

The garbage collection operation may include an operation of searching for an area which cannot be used any more or does not need to be used, among dynamically allocated memory areas, erasing data in the corresponding area, and preparing to program new data to the area. The garbage collection operation may be performed in the memory system 110 without a separate request of the host 102. The garbage collection operation may be separately performed in each of the map area and the user area which are included in the memory device 150.

Referring to FIG. 6A, the controller 130 may select a memory block from which data can be erased, among the plurality of memory blocks in the memory device 150. Hereafter, the selected memory block will be referred to as a victim memory block 610. In order to secure a space for storing large-scale data or perform garbage collection or wear leveling, the controller 130 may move valid data stored in the victim memory block 610 to a target memory block 630.

Specifically, the controller 130 may select the victim memory block 610 in the memory device 150. At this time, the controller 130 may preferentially select a memory block as the victim memory block. The victim memory block may have the smallest number of valid pages among the plurality of memory blocks. The valid page may indicate a page having valid data stored therein. The controller 130 may read valid data from the victim memory block 610, store the read valid data in the memory 144 of the controller 130, and program victim data to the target memory block 630 in the memory device 150. The controller 130 may erase all of the data stored in the victim memory block 610. The controller 130 may store new data in the victim memory block 610 from which all of the data have been erased.

As described above, the controller 130 may separately perform a background operation on each of the map area and the user area within the memory device 150.

For example, the controller 130 may select a victim memory block among the plurality of memory blocks in the map data area 210 and the first OP area 215, and move valid data stored in the victim memory block to the target memory block. In this way, the controller 130 may perform a garbage collection operation on only the map area.

According to the same principle, the controller 130 may select a victim memory block among the plurality of memory blocks in the user data area 230 and the second OP area 235, and move valid data in the victim memory block to the target memory block as described above. In this way, the controller 130 may perform a garbage collection operation on only the user area.

FIG. 6B is a flowchart illustrating the operation process of the memory system 110 in accordance with the present embodiment.

Referring to FIG. 6B, in step S601, the controller 130 may select a victim memory block among the plurality of memory blocks in the memory device 150, based on a preset criterion. In particular, the controller 130 may select a memory block as the victim memory block, which has the number of valid pages greater than or equal to a predetermined threshold value, among the plurality of memory blocks. The operation of selecting the victim memory block may be performed under control of the processor 134 within the controller 130.

In step S603, the controller 130 may load valid data in the selected victim memory block of the memory device 150 and store the loaded valid data into the memory 144 of the controller 130. Even at this time, the valid data in the victim memory block may be read from the memory device 150 and stored in the memory 144, under control of the processor 134.

In step S605, the controller 130 may store the valid data in the memory 144 into a target memory block among the plurality of memory blocks in the memory device 150. Specifically, the processor 134 may control the memory 144 and the memory device 150 to store the valid data in the memory 144 into the target memory block.

In step S607, the controller 130 may erase the data stored in the victim memory block. Specifically, the processor 134 may control the memory device 150 to erase the data stored in the victim memory block. At this time, the processor 134 may control the memory device 150 to erase invalid data as well as the valid data stored in the victim memory block.

As described with reference to FIGS. 6A and 6B, the garbage collection operation is a preparation operation for efficiently performing a main operation which is to be performed afterwards (for example, a read operation or write operation). Therefore, the garbage collection operation needs to be efficiently performed as one method for improving the performance of the memory system 110.

In order to efficiently perform the garbage collection operation, the controller 130 needs to efficiently perform a first operation and a second operation. The first operation may include copying valid data from a victim memory block included in the map area or the user area into a target memory block. The second operation may include erasing the data stored in the victim memory block. During the first operation, when the controller 130 efficiently performs the operation of selecting the victim memory block having valid data stored therein and corresponding to the target of the garbage collection operation and the operation of storing the valid data in the target memory block, the efficiency of the garbage collection operation may be improved.

As described with reference to FIG. 2, the memory system 110 may utilize the OP area to efficiently perform the garbage collection operation. The OP area may reduce the valid page ratio of the map area or the user area. Specifically, the reserved memory blocks included in the OP area may reduce the valid page ratio of closed memory blocks in the map data area or the user data area. The valid page ratio may indicate a ratio of the space in which valid pages are stored, with respect to the entire space of the map area or the user area. Therefore, each of the map area and the user area may include the OP area, and thus expand the entire space. Thus, the ratio of valid pages in each of the map area and the user area may be reduced through the OP area.

The reduction in the valid page ratio may decrease the cost required for the first operation of copying valid data from the victim memory block into the target memory block. That is because, when the ratio of valid pages with respect to the entire space of the map area or the user area is low, it indicates that the amount of valid data which are to be copied by the controller 130 is small. Therefore, the garbage collection operation performed when the valid page ratio is high may have lower efficiency than the garbage collection operation performed when the valid page ratio is low.

The processor 134 may allocate a part of the entire memory blocks in the memory device 150 to the map area, and allocate the other part of the entire memory blocks to the user area. Since a space required for storing user data may be greater than a space required for storing map data, the processor 134 may allocate more memory blocks to the user area than the map area.

Since the number of memory blocks allocated to the map area is less than the number of memory blocks allocated to the user area, the controller 130 may perform a garbage collection operation to secure a space for storing map data in the map area, even though the valid page ratio is high. However, the garbage collection operation performed when the valid page ratio is high may not be efficient.

Hereafter, a background operation method of the memory system 110 capable of solving the inefficiency will be described.

Figure 7A:
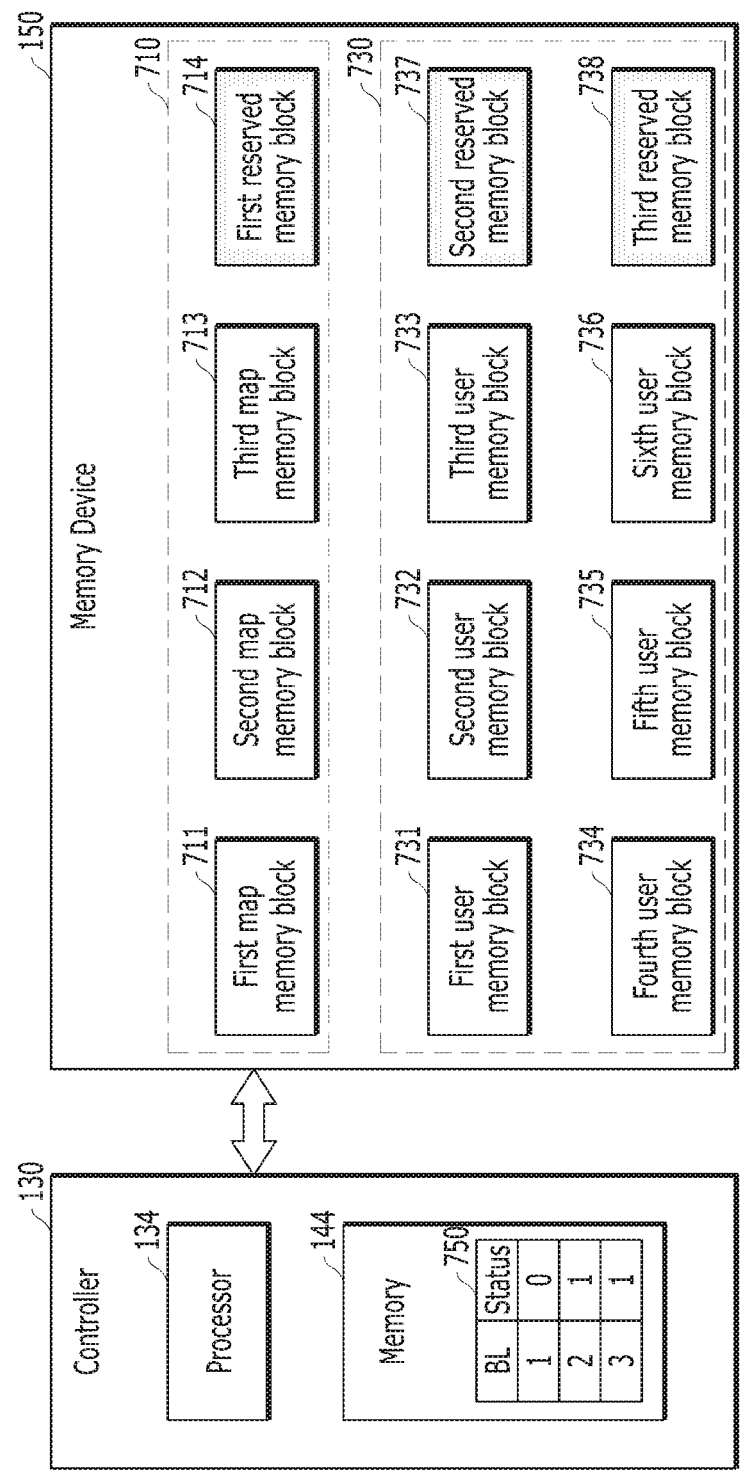
FIG. 7A to 7C are diagrams illustrating an operation of a memory system in accordance with an embodiment of the present disclosure.
Figure 7B:
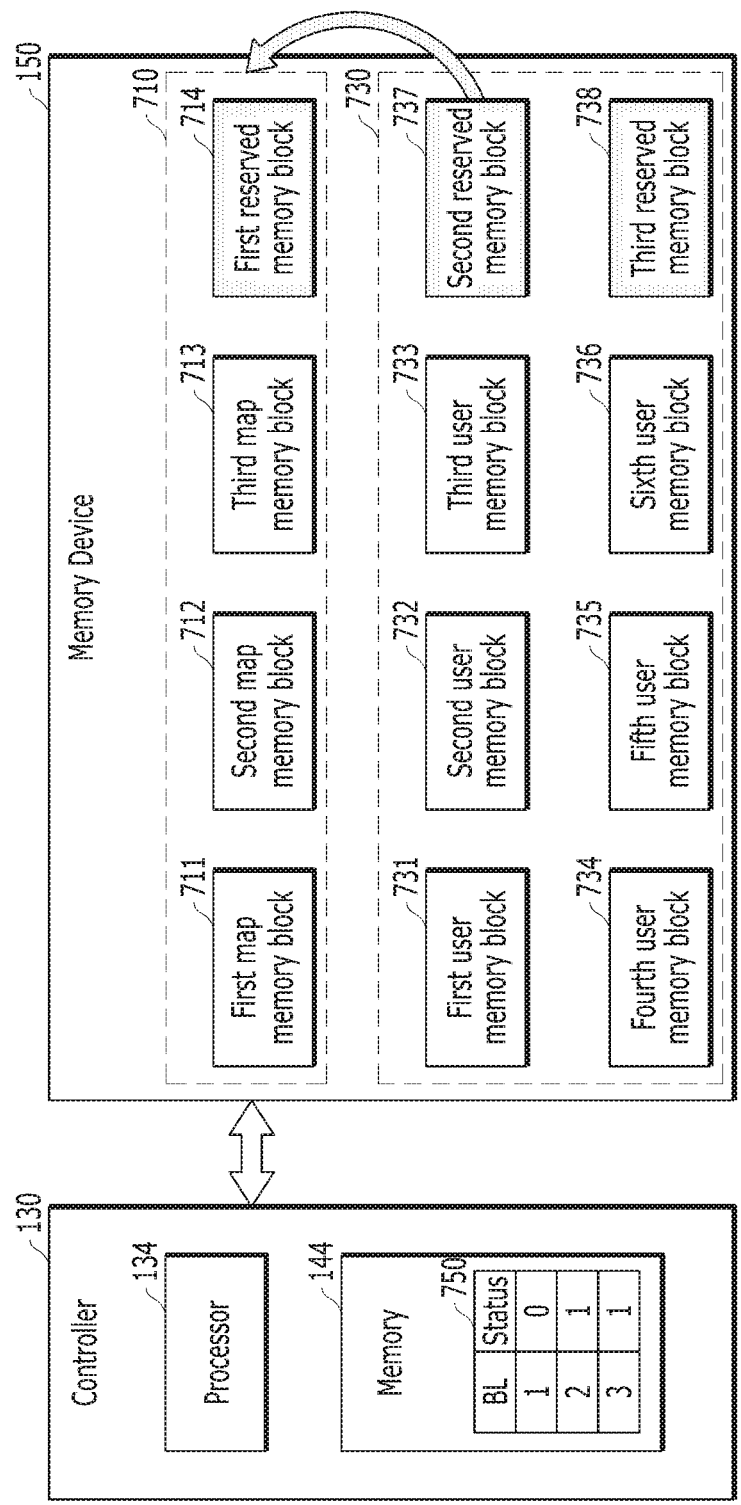
Figure 7C:
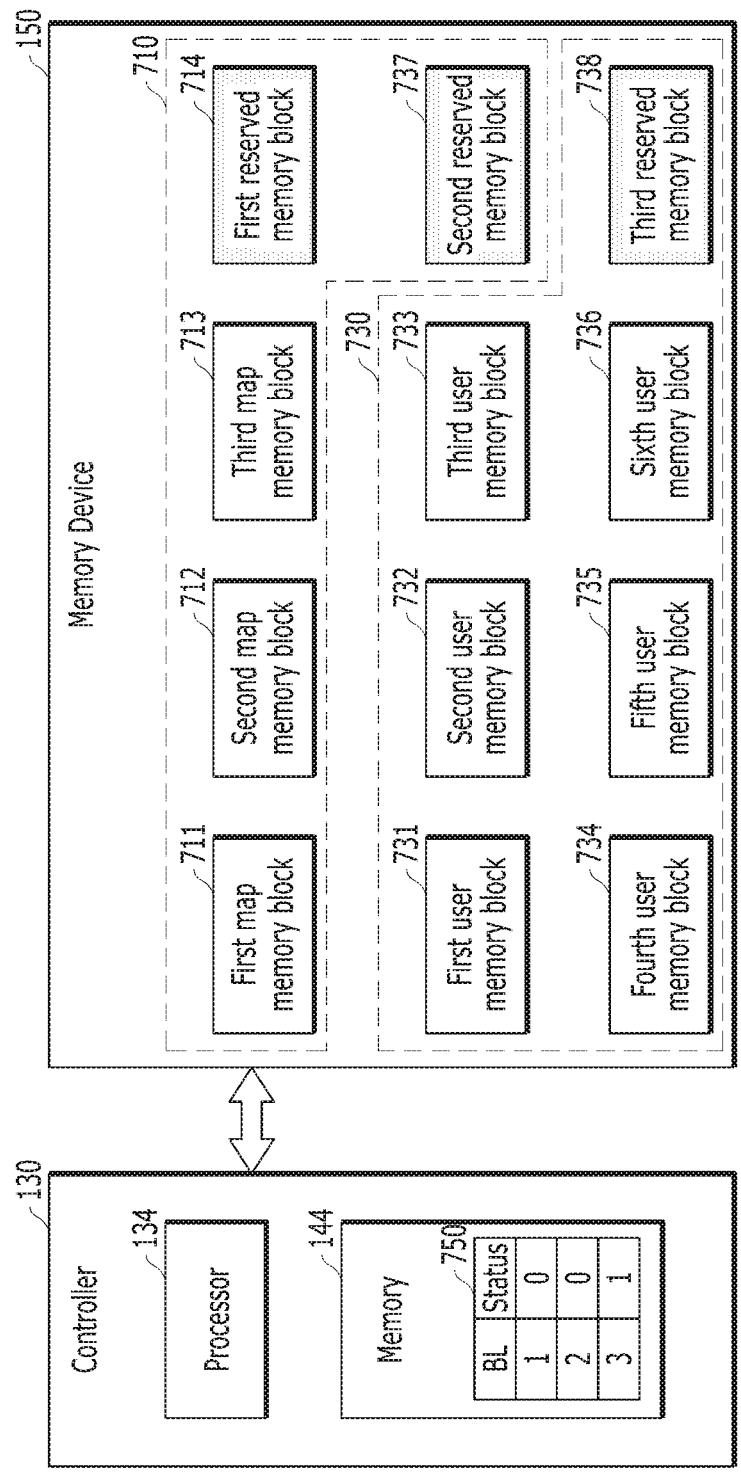

FIGS. 7A to 7C are diagrams illustrating an operation of the memory system 110 in accordance with an embodiment. By way of example, FIGS. 7A to 7C show a process in which the memory system 110 performs a garbage collection operation. In particular, the garbage collection operation performed on the map area will be described.

In an example, FIGS. 7A to 7C illustrate that the memory device 150 includes 12 memory blocks. Furthermore, it is supposed that a first threshold value is '90%' and a second threshold value is '40%'. The first threshold value and the second threshold value may be set by a designer. Furthermore, in FIGS. 7A and 7B, it is supposed that the valid page ratio of a map area 710 is '90%', and the valid page ratio of a user area 730 is '35%'. This is only an example, and the present embodiment is not limited thereto.

Referring to FIG. 7A, the processor 134 may allocate four memory blocks to the map area 710, and allocate eight memory blocks to the user area 730. In other words, the memory device 150 may include the map area 710 and the user area 730.

The map area 710 may include a map data area and a first OP area. The map data area may include a first map memory block 711, a second map memory block 712 and a third memory block 713, and the first OP area may include a first reserved memory block 714.

The user area 730 may include a user data area and a second OP area. The user data area may include a first user memory block 731, a second user memory block 732, a third user memory block 733, a fourth user memory block 734, a fifth user memory block 735 and a sixth user memory block 736, and the second OP area may include a second reserved memory block 737 and a third reserved memory block 738.

The memory 144 may include an OP table 750. The OP table 750 may include information regarding the positions of the first to third reserved memory blocks 714, 737 and 738. The OP table 750 may include a first field (BL) for indicating reserved memory blocks and a second field (Status) for indicating positions of reserved memory blocks. For example, the position information of the first reserved memory block 714 allocated to the map area 710 may be indicated as '0' in the OP table 750. For another example, the position information of the second and third reserved memory blocks 737 and 738 allocated to the user area 730 may be indicated as '1' in the OP table 750.

Referring to FIG. 7B, the processor 134 may perform a garbage collection operation to secure a space for programming new data in the map area 710. At this time, the processor 134 may perform the garbage collection operation based on the valid page ratio of the map area 710, monitored by the monitor 146.

Specifically, the processor 134 may compare the monitored valid page ratio of the map area 710 to the first threshold value of '90%'. When the valid page ratio of the map area 710 is less than '90%', the processor 134 may perform the garbage collection operation only in the map area 710.

When the valid page ratio of the map area 710 is greater than or equal to '90%', the processor 134 may compare the valid page ratio of the user area 730 to the second threshold value of '40%'. When the valid page ratio of the user area 730 is greater than or equal to '40%.', the processor 134 may perform the garbage collection operation only in the map area 710.

When the valid page ratio of the user area 730 is less than '40%', the processor 134 may reallocate one or more of the reserved memory blocks 737 and 738 in the user area 730 to the map area 710. For example, the reserved memory blocks 737 may be reallocated and the reallocated reserved memory block 737 may be a free memory block.

Since the number of memory blocks allocated to the map area 710 is less than the number of memory blocks allocated to the user area 730, the processor 134 may reduce the valid page ratio of the map area 710 by reallocating the reserved memory blocks in the user area 730 to the map area 710. As a result, the performance of the garbage collection operation performed in the map area 710 may be improved.

Since the valid page ratio of the user area 730 is less than the second threshold value, the reallocating of the reserved memory block in the user area 730 to the map area 710 may not affect the performance of the garbage collection operation performed in the user area 730.

Referring to FIG. 7C, the processor 134 may reallocate the second reserved memory block 737 to the map area 710.

The processor 134 may update the OP table 750 in the memory 144. That is, the processor 134 may update the position information of the second reserved memory block 737, stored in the OP table 750, that is, the status corresponding to BL 2 into '0'. Then, the processor 134 may perform a garbage collection operation on the map area 710 including the reallocated second reserved memory block 737.

Although not illustrated in the drawings, when the valid data ratio of the map area is less than a third threshold value and the valid data ratio of the user area is greater than or equal to a fourth threshold value, the processor 134 may reallocate the reserved memory block, which has been reallocated to the map area from the user area, to the user area from the map area. Hereafter, the reserved block will be referred to as a target reserved memory block. That is, the processor 134 may reallocate the positions of the reserved memory blocks based on the respective valid data ratios of the map area and the user area. While reallocating the positions of the reserved memory blocks, the processor 134 may improve the performance of the garbage collection operation for each of the map area and the user area.

Figure 8:
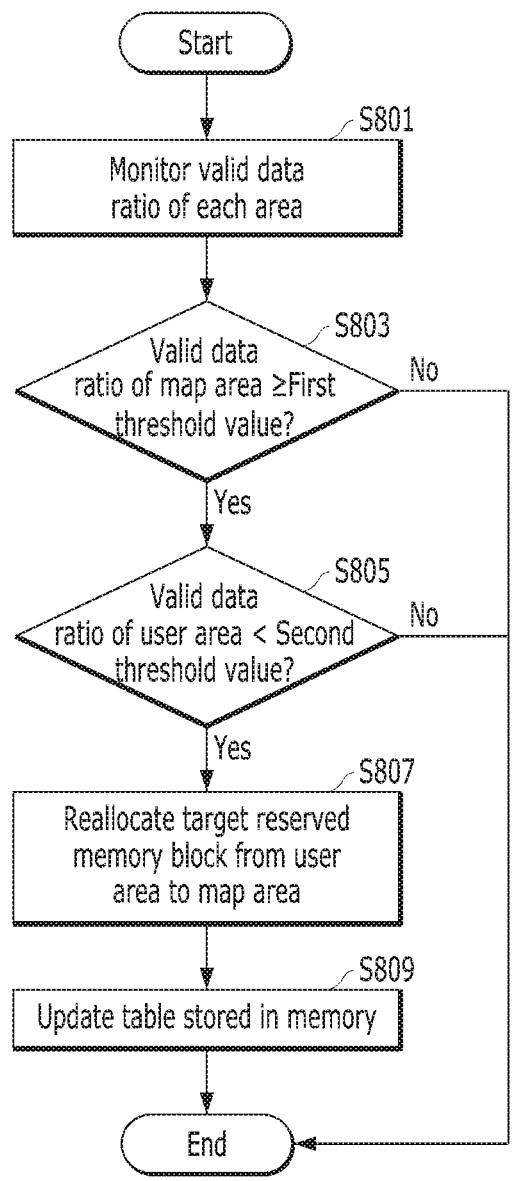
FIG. 8 is a flow chart illustrating an operation process of a memory system in accordance with an embodiment of the present embodiment.

FIG. 8 is a flowchart illustrating the operation process of the memory system 110 in accordance with the present embodiment. By way of example, FIG. 8 shows a process of reallocating a target reserved memory block in the user area to the map area under control of the processor 134.

Referring to FIG. 8, in step S801, the monitor 146 may monitor the valid data ratio of each of the map area and the user area.

In step S803, the processor 134 may compare the valid data ratio of the map area to the first threshold value. The first threshold value may be set by a designer.

When the valid data ratio of the map area is greater than or equal to the first threshold value ('Yes' in step S803), the processor 134 may compare the valid data ratio of the user area to the second threshold value in step S805. The second threshold value may be set by a designer.

When the valid data ratio of the user area is less than the second threshold value ('Yes' in step S805), the processor 134 may reallocate the target reserved memory block in the user area to the map area in step S807.

In step S809, the processor 134 may update position information corresponding to the target reserved memory block in the OP table in the memory 144.

When the valid data ratio of the map area is less than the first threshold value ('No' in step S803) or the valid data ratio of the user area is greater than or equal to the second threshold value ('No' in step S805), the processor 134 may not reallocate the reserved memory block.

Figure 9:
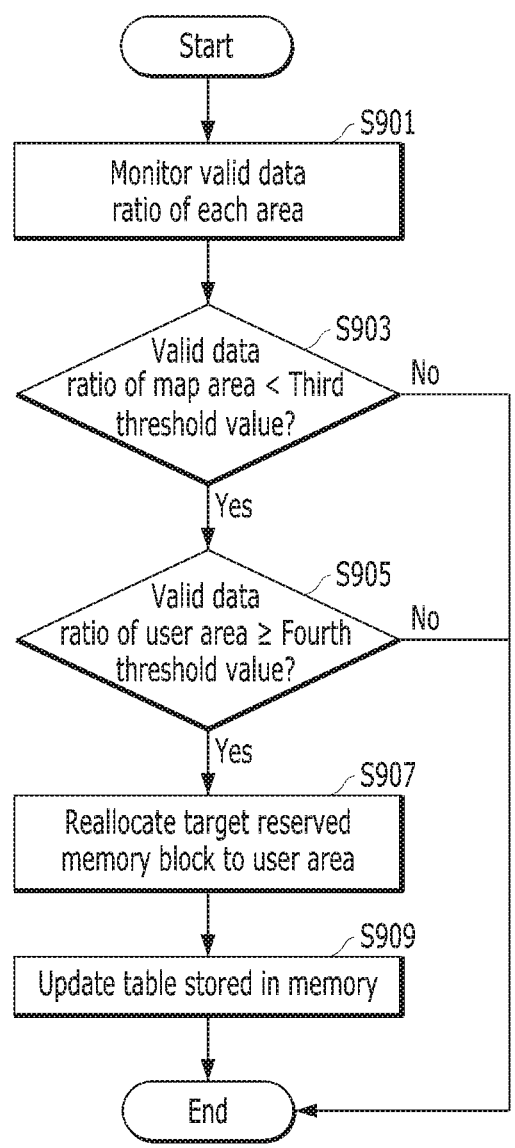
FIG. 9 is a flow chart illustrating an operation process of a memory system in accordance with another embodiment of the present embodiment.

FIG. 9 is a flowchart illustrating the operation process of the memory system 110 in accordance with the present embodiment. By way of example, FIG. 9 shows a process of reallocating the target reserved memory block, allocated to the map area described with reference to FIG. 8, to the user area under control of the processor 134.

Referring to FIG. 9, in step S901, the monitor 146 may monitor the valid data ratio of each of the map area and the user area.

In step S903, the processor 134 may compare the valid data ratio of the map area to a third threshold value. The third threshold value may be set by a designer.

When the valid data ratio of the map area is less than the third threshold value ('Yes' in step S903), the processor 134 may compare the valid data ratio of the user area to a fourth threshold value in step S905. The fourth threshold value may be set by a designer.

When the valid data ratio of the user area is greater than or equal to the fourth threshold value ('Yes' in step S905), the processor 134 may reallocate the target reserved memory block in the map area to the user area in step S907.

In step S909, the processor 134 may update position information corresponding to the target reserved memory block in the OP table in the memory 144.

When the valid data ratio of the map area is greater than or equal to the third threshold value ('No' in step S903) or the valid data ratio of the user area is less than the fourth threshold value ('No' in step S905), the processor 134 may not reallocate the reserved memory block.

As described above, the memory system 10 in accordance with the present embodiment may improve the performance of the background operation while reallocating the positions of the reserved memory blocks included in the OP areas based on the valid page ratios of the map area and the user area.

Hereinbelow, detailed descriptions will be made with reference to FIGS. 10 to 18, for a data processing system and electronic appliances to which the memory system 110 including the memory device 150 and the controller 130 described above with reference to FIGS. 1 to 9, in accordance with the embodiment of the disclosure, is applied.

Figure 10:
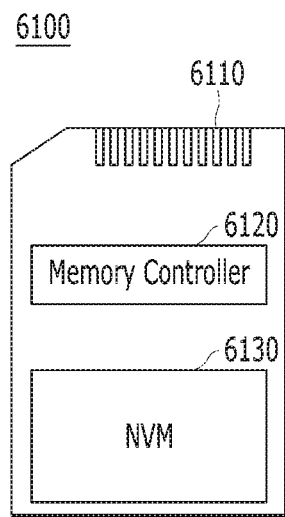
FIGS. 10 to 18 are diagrams illustrating exemplary applications of a data processing system in accordance with various embodiments of the present invention.

FIG. 10 is a diagram illustrating another example of a data processing system including a memory system in accordance with an embodiment. For example, FIG. 10 illustrates a memory card system 6100 to which the memory system may be applied.

Referring to FIG. 10, the memory card system 6100 may include a memory controller 6120, a memory device 6130 and a connector 6110.

More specifically, the memory controller 6120 may be electrically connected to, and configured to access, the memory device 6130 embodied by a nonvolatile memory (NVM). For example, the memory controller 6120 may be configured to control read, write, erase and background operations of the memory device 6130. The memory controller 6120 may be configured to provide an interface between the memory device 6130 and a host, and to use firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a random access memory (RAM), a processor, a host interface, a memory interface and an error correction component.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), advanced technology attachment (ATA), serial-ATA, parallel-ATA, small computer system interface (SCSI), enhanced small disk interface (EDSI), integrated drive electronics (IDE), Firewire, universal flash storage (UFS), wireless fidelity (Wi-Fi or WiFi) and Bluetooth. Thus, the memory system and the data processing system in accordance with the present embodiment may be applied to wired/wireless electronic devices or specific mobile electronic devices.

The memory device 6130 may be implemented by a nonvolatile memory (NVM). For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device to form a solid-state drive (SSD). Also, the memory controller 6120 and the memory device 6130 may be so integrated to form a memory card such as a PC card (personal computer memory card international association (PCMCIA)), a compact flash (CF) card, a smart media card (e.g., a SM and a SMC), a memory stick, a multimedia card (e.g., a MMC, a RS-MMC, a MMCmicro and an eMMC), a secure digital (SD) card (e.g., a SD, a miniSD, a microSD and a SDHC), and/or a universal flash storage (UFS).

Figure 11:
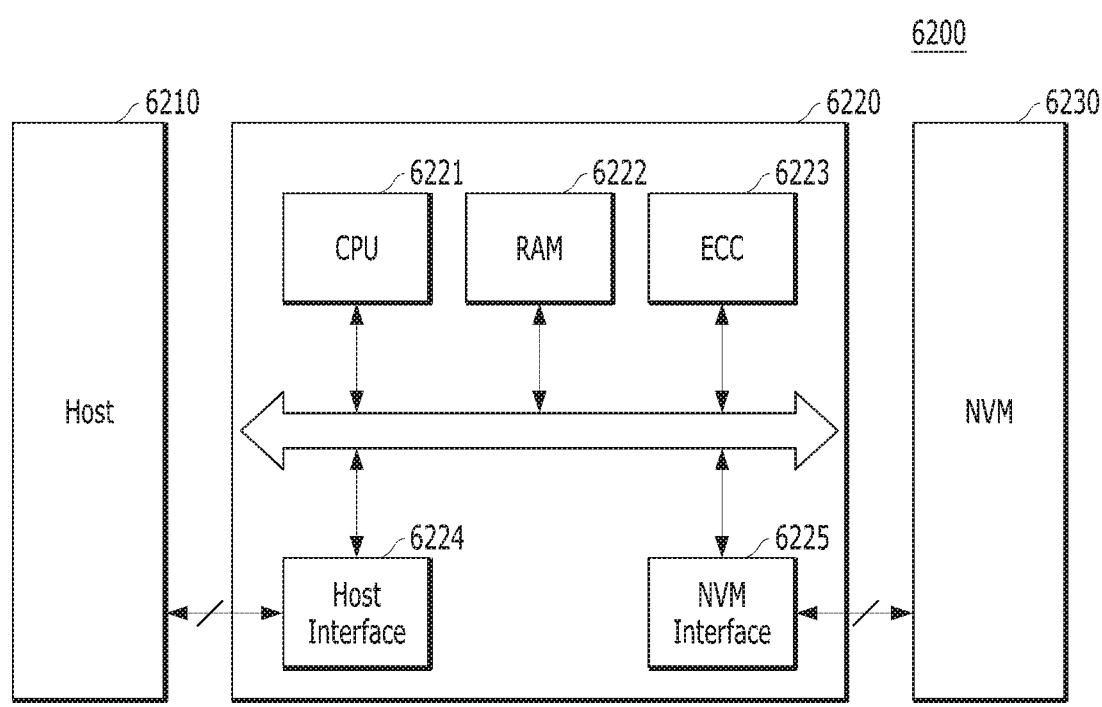

FIG. 11 is a diagram illustrating another example of a data processing system 6200 including a memory system in accordance with an embodiment.

Referring to FIG. 11, the data processing system 6200 may include a memory device 6230 having one or more nonvolatile memories (NVMs) and a memory controller 6220 for controlling the memory device 6230. The data processing system 6200 illustrated in FIG. 11 may serve as a storage medium such as a memory card (e.g., CF, SD, micro-SD or the like) or USB device, as described with reference to FIG. 1. The memory device 6230 may correspond to the memory device 150 in the memory system 110 illustrated in FIG. and the memory controller 6220 may correspond to the controller 130 in the memory system 110 illustrated in FIG. 1.

The memory controller 6220 may control a read, write or erase operation on the memory device 6230 in response to a request of the host 6210. The memory controller 6220 may include one or more central processing units (CPUs) 6221, a buffer memory such as a random access memory (RAM) 6222, an error correction code (ECC) circuit 6223, a host interface 6224 and a memory interface such as a nonvolatile memory (NVM) interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or vice versa. When the RAM 6222 is used as a cache memory, the RAM 6222 may assist the low-speed memory device 6230 to operate at high speed.

The ECC circuit 6223 may generate an error correction code (ECC) for correcting a failed bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. The ECC circuit 6223 may correct an error using the low density parity check (LDDC) code, Bose-Chaudhri-Hocquenghem (BCH) code, turbo code, Reed-Solomon (RS) code, convolution code, recursive systematic code (RSC) or coded modulation such as trellis coded modulation (TCM) or block coded modulation (BCM).

The memory controller 6220 may transmit/receive data to/from the host 6210 through the host interface 6224. The memory controller 6220 may transmit/receive data to/from the memory device 6230 through the NVM interface 6225. The host interface 6224 may be connected to the host 6210 through a parallel advanced technology attachment (PATH) bus, a serial advanced technology attachment (SATA) bus, a small computer system interface (SCSI), a universal serial bus (USB), a peripheral component interconnect-express (PCIe) or a NAND interface. The memory controller 6220 may have a wireless communication function with a mobile communication protocol such as wireless fidelity (WiFi) or long term evolution (LTE). The memory controller 6220 may be connected to an external device, for example, the host 6210 or another external device, and then transmit/receive data to/from the external device. In particular, as the memory controller 6220 is configured to communicate with the external device according to one or more of various communication protocols, the memory system and the data processing system in accordance with an embodiment may be applied to wired/wireless electronic devices, particularly a mobile electronic device.

Figure 12:
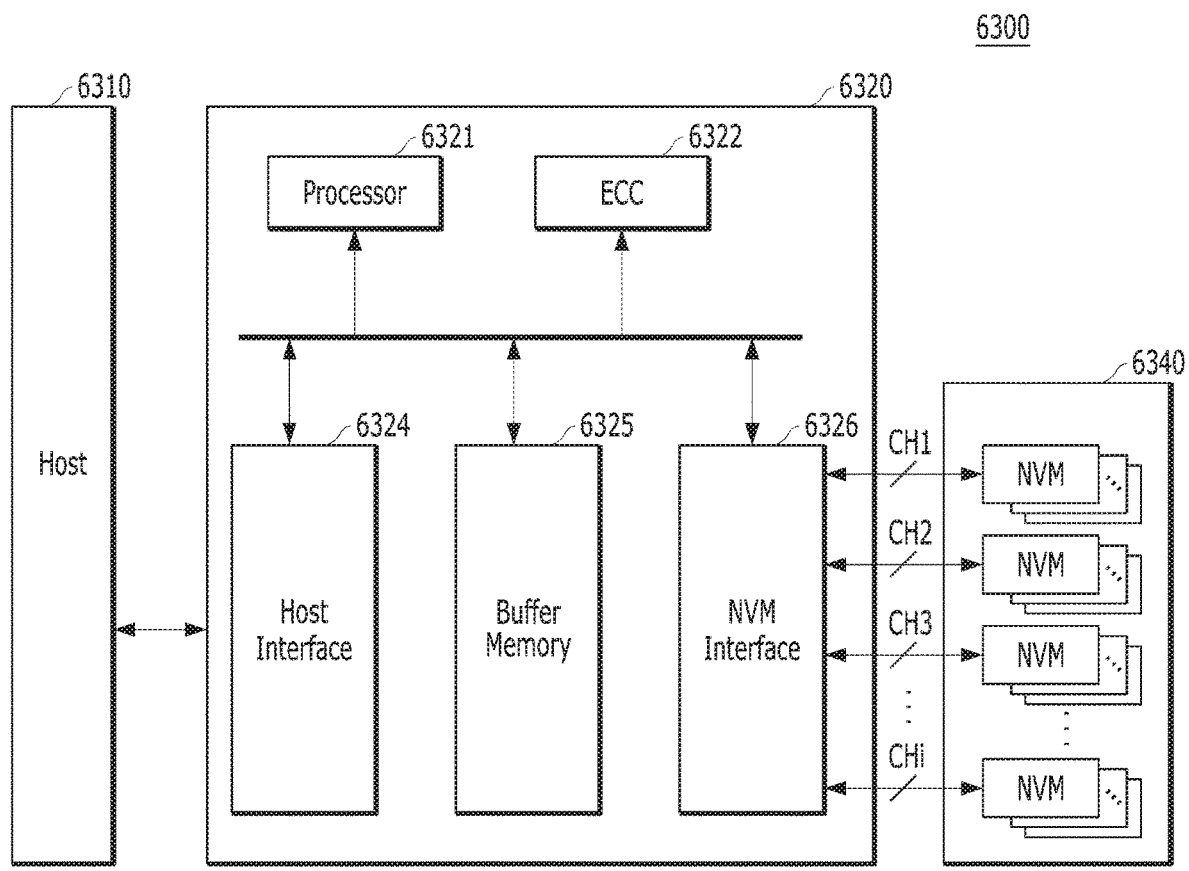

FIG. 12 is a diagram illustrating another example of a data processing system including a memory system in accordance with an embodiment. For example, FIG. 12 illustrates a solid state drive (SSD) 6300 to which the memory system may be applied.

Referring to FIG. 12, the SSD 6300 may include a controller 6320 and a memory device 6340 including a plurality of nonvolatile memories (NVMs). The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

The buffer memory 6325 may temporarily store data provided from the host 6310 or data provided from a plurality of flash memories NVM included in the memory device 6340. Further, the buffer memory 6325 may temporarily store meta data of the plurality of flash memories NVM, for example, map data including a mapping table. The buffer memory 6325 may be embodied by any of a variety of volatile memories such as a dynamic random access memory (DRAM), a synchronous DRAM (SDRAM), a double data rate (DDR) SDRAM, a low power DDR (LPDDR) SDRAM and a graphics RAM (GRAM) or nonvolatile memories such as a ferroelectric RAM (FRAM), a resistive RAM (RRAM or ReRAM), a spin-transfer torque magnetic RAM (STT-MRAM) and a phase-change RAM (PRAM). FIG. 12 illustrates that the buffer memory 6325 is embodied in the controller 6320. However, the buffer memory 6325 may be external to the controller 6320.

The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 may be applied may be provided to embody a data processing system, for example, a redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 13:
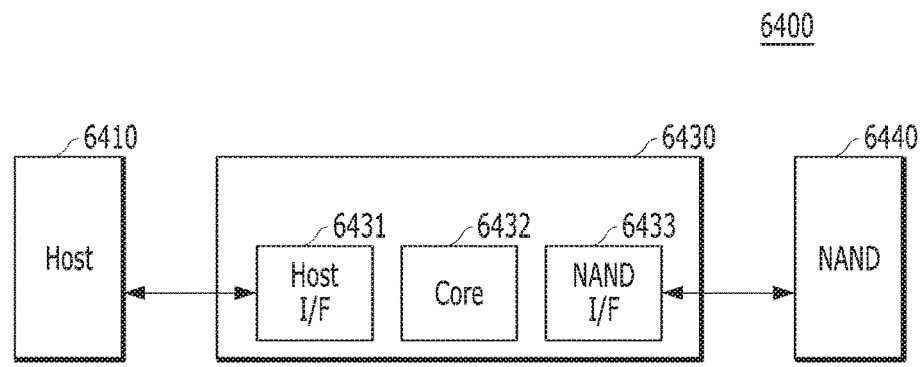

FIG. 13 is a diagram illustrating another example of a data processing system including a memory system in accordance with an embodiment. For example, FIG. 13 illustrates an embedded multi-media card (eMMC) 6400 to which the memory system may be applied.

Referring to FIG. 13, the eMMC 6400 may include a controller 6430 and a memory device 6440 embodied by one or more NAND flash memories. The controller 6430 may correspond to the controller 130 in the memory system 110 of FIG. 1. The memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, ultra high speed (UHS)-I/UHS-II) interface.

FIGS. 14 to 17 are diagrams illustrating other examples of a data processing system including a memory system in accordance with embodiments. For example, FIGS. 14 to 17 illustrate universal flash storage (UFS) systems to which the memory system may be applied.

Referring to FIGS. 14 to 17, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices, particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices, particularly mobile electronic devices through UFS protocols, and the UFS devices 6520, 6620, 6720, 6820 and the UFS cards 6530, 6630, 6730, 6830 may be embodied by the memory system 110 illustrated in FIG. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 11 to 13, and the UFS cards 6530, 6630, 6730, 6830 may be embodied in the form of the memory card system 6100 described with reference to FIG. 10.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI unified protocol (UniPro) in mobile industry processor interface (MIPI). Furthermore, the UFS devices 6520, 6620, 6720, 6820 and the UFS cards 6530, 6630, 6730, 6830 may communicate with each other through any of various protocols other than the UFS protocol, for example, universal storage bus (USB) Flash Drives (UFDs), a multi-media card (MMC), a secure digital (SD), a mini-SD, and a micro-SD.

Figure 14:
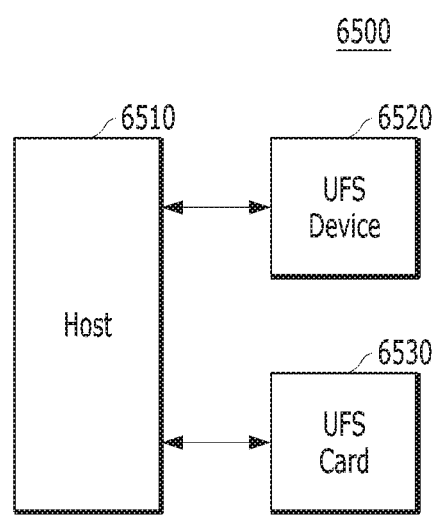

In the UFS system 6500 illustrated in FIG. 14, each of the host 6510, the UFS device 6520 and the UFS card 6530 may include UniPro. The host 6510 may perform a switching operation to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the illustrated embodiment, one UFS device 6520 and one UFS card 6530 are connected to the host 6510. However, a plurality of UFS devices and UFS cards may be connected in parallel or in the form of a star to the host 6410. A star formation is an arrangement in which a single device is coupled with plural devices for centralized operation. A plurality of UFS cards may be connected in parallel or in the form of a star to the UFS device 6520, or connected in series or in the form of a chain to the UFS device 6520.

Figure 15:
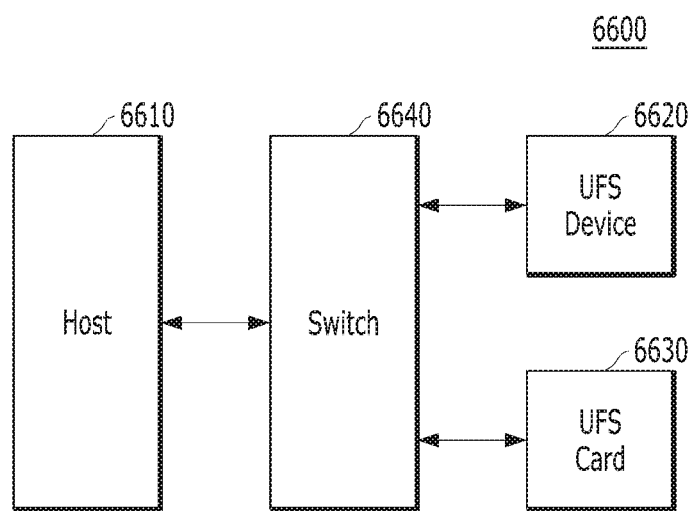

In the UFS system 6600 illustrated in FIG. 15, each of the host 6610, the UFS device 6620 and the UFS card 6630 may include UniPro. The host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the illustrated embodiment, one UFS device 6620 and one UFS card 6630 are connected to the switching module 6640. However, a plurality of UFS devices and UFS cards may be connected in parallel or in the form of a star to the switching module 6640. A plurality of UFS cards may be connected in series or in the form of a chain to the UFS device 6620.

Figure 16:
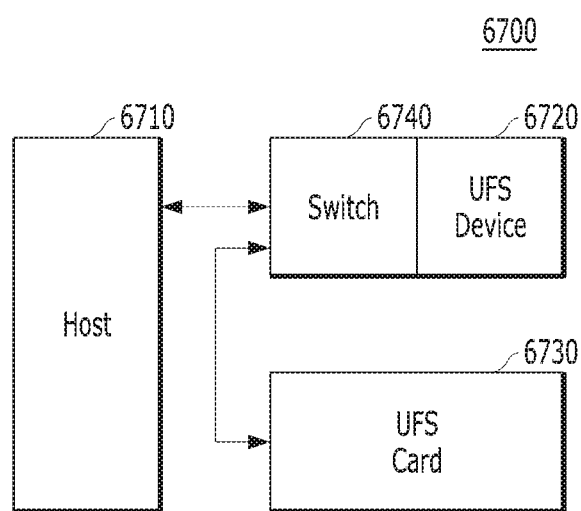

In the UFS system 6700 illustrated in FIG. 16, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro. The switching module 6740 may be integrated as one module with the UFS device 6720 inside or outside the UFS device 6720. In the illustrated embodiment, one UFS device 6720 and one UFS card 6730 are connected to the switching module 6740. However, a plurality of modules, each including the switching module 6740 and the UFS device 6720, may be connected in parallel or in the form of a star to the host 6710. In another example, a plurality of modules may be connected in series or in the form of a chain to each other. Furthermore, a plurality of UFS cards may be connected in parallel or in the form of a star to the UFS device 6720.

Figure 17:
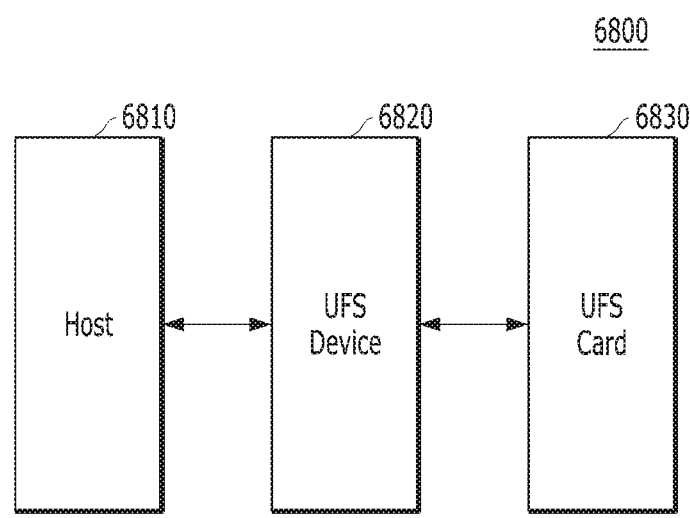

In the UFS system 6800 illustrated in FIG. 17, each of the host 6810, the UFS device 6820 and the UFS card 6830 may include M-PHY and UniPro. The UFS device 6820 may perform a switching operation to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target identifier (ID) switching operation. The host 6810 and the UFS card 6830 may communicate with each other through target ID switching between the M-PHY and UniPro modules of the UFS device 6820. In the illustrated embodiment, one UFS device 6820 is connected to the host 6810 and one UFS card 6830 is connected to the UFS device 6820. However, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 18:
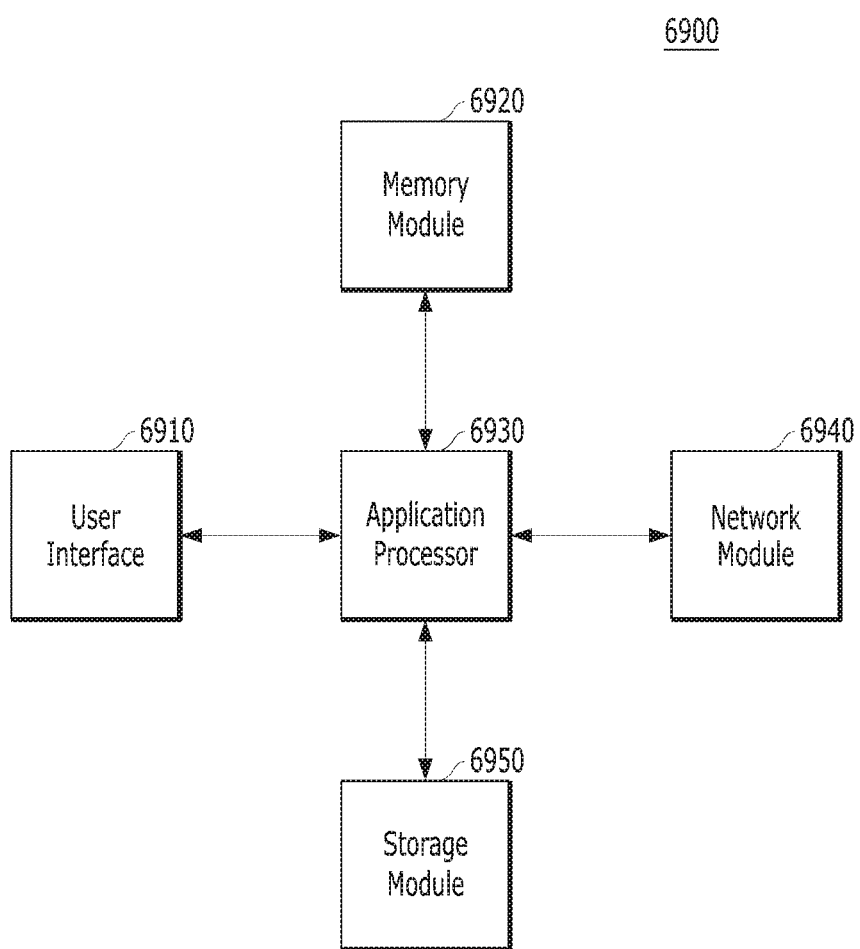

FIG. 18 is a diagram illustrating another example of a data processing system including a memory system in accordance with an embodiment of the present invention. For example, FIG. 18 is a diagram illustrating a user system 6900 to which the memory system may be applied.

Referring to FIG. 18, the user system 6900 may include a user interface 6910, a memory module 6920, an application processor 6930, a network module 6940 and a storage module 6950.

More specifically, the application processor 6930 may drive components in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random access memory (RAM) such as a dynamic RAM (DRAM), a synchronous DRAM (SDRAM), a double data rate (DDR) SDRAM, a DDR2 SDRAM, a DDR3 SDRAM, a low power DDR (LPDDR) SDARM, a LPDDR3 SDRAM or a LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on package on package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, an eMMC and an UFS as described above with reference to FIGS. 12 to 17.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

According to the embodiments, the data processing system may efficiently perform background operation.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a memory device including a plurality of memory blocks; and
a controller configured to control the memory device,
wherein the controller
is configured to monitor valid data ratios of a first area and a second area,
compare a first valid data ratio of the first area to a first threshold value, compare a second valid data ratio of the second area to a second threshold value, and reallocate a target reserved memory block, which is allocated to the second area, to the first area according to the two comparison results.

2. The memory system of claim 1, wherein, when the first valid data ratio is greater than or equal to the first threshold value, the controller compares the second valid data ratio to the second threshold value.

3. The memory system of claim 2, wherein, when the second valid data ratio is less than the second threshold value, the controller reallocates the target reserved memory block to the first area.

4. The memory system of claim 2, wherein, when the second valid data ratio is greater than or equal to the second threshold value, the controller maintains positions of memory blocks allocated to the first area and the second area.

5. The memory system of claim 1, wherein the controller comprises a memory configured to store a table indicating position information of reserved memory blocks.

6. The memory system of claim 5, wherein the controller updates the table after reallocating the target reserved memory block.

7. The memory system of claim 5, wherein, when the first valid data ratio is less than a third threshold value and the second valid data ratio is greater than or equal to a fourth threshold value, the controller reallocates the target reserved memory block, which is allocated to the first area, to the second area.

8. The memory system of claim 7, wherein the controller updates the table after reallocating the target reserved memory block to the second area.

9. The memory system of claim 1, wherein the controller stores map data in the first area, and stores user data in the second area.

10. The memory system of claim 1, wherein the controller performs a background operation on the first area, after reallocating the target reserved memory block.

11. The memory system of claim 10, wherein the background operation comprises at least one of a garbage collection operation, a wear leveling operation, and a read reclaim operation.

12. The memory system of claim 1, wherein, when the first valid data ratio is less than the first threshold value, the controller maintains positions of memory blocks allocated to the first area and the second area.

13. An operation method of a memory system which includes a memory device and a controller, the operation method comprising:
   monitoring valid data ratios of a first area and a second area within the memory device;
   comparing a first valid data ratio of the first area to a first threshold value;
   comparing a second valid data ratio of the second area to a second threshold value; and
   reallocating a target reserved memory block, which is allocated to the second area, to the first area according to the two comparison results.

14. The operation method of claim 13, further comprising storing a table in a memory within the controller, the table indicating position information of reserved memory blocks included in the memory device.

15. The operation method of claim 14, further comprising updating the table after reallocating the target reserved memory block to the first area.

16. The operation method of claim 14, further comprising reallocating the target reserved memory block, which is allocated to the first area, to the second area, when the first valid data ratio is less than a third threshold value and the second valid data ratio is greater than or equal to a fourth threshold value.

17. The operation method of claim 16, further comprising updating the table after reallocating the target reserved memory block to the second area.

18. The operation method of claim 13, further comprising performing a background operation on the first area after the reallocating of the target reserved memory block.

19. The operation method of claim 13, further comprising maintaining positions of memory blocks allocated to the first area and the second area, when the first valid data ratio is less than the first threshold value.

20. The operation method of claim 13, further comprising maintaining positions of memory blocks allocated to the first area and the second area, when the second valid data ratio is greater than or equal to the second threshold value.

21. The operation method of claim 13, wherein the comparing the second valid data ratio of the second area to the second threshold value includes comparing the second valid data ratio to the second threshold value when the first valid data ratio is greater than or equal to the first threshold value.

22. The operation method of claim 13, wherein the reallocating the target reserved memory block includes reallocating the target reserved memory block, which is allocated to the second area, to the first area when the second valid data ratio is less than the second threshold value.

* * * * *